US008668583B2

(12) United States Patent
Fujimoto

(10) Patent No.: US 8,668,583 B2
(45) Date of Patent: Mar. 11, 2014

(54) GAME SYSTEM, GAME MACHINE AND GAME PROGRAM

(75) Inventor: Eisaku Fujimoto, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 283 days.

(21) Appl. No.: 13/124,040

(22) PCT Filed: Oct. 21, 2009

(86) PCT No.: PCT/JP2009/068128
§ 371 (c)(1),
(2), (4) Date: Apr. 13, 2011

(87) PCT Pub. No.: WO2010/067663
PCT Pub. Date: Jun. 17, 2010

(65) Prior Publication Data
US 2011/0201426 A1     Aug. 18, 2011

(30) Foreign Application Priority Data

Dec. 11, 2008    (JP) .................................. 2008-315947

(51) Int. Cl.
*A63F 9/24*     (2006.01)
(52) U.S. Cl.
USPC ........................ 463/31; 463/1; 463/32; 463/33
(58) Field of Classification Search
USPC ........................................ 463/1, 9, 31, 32, 33
See application file for complete search history.

(56) References Cited

U.S. PATENT DOCUMENTS 6,283,854 B1 * 9/2001 Niwa ................................ 463/7
6,358,148 B1 * 3/2002 Tanaka ............................ 463/23
6,488,582 B1 * 12/2002 Suzuki ............................ 463/31
8,168,435 B2 * 5/2012 Noguchi et al. ................. 436/5
2001/0046896 A1 * 11/2001 Miyamoto et al. ............. 463/31
2007/0060342 A1    3/2007 Sakaguchi et al.

FOREIGN PATENT DOCUMENTS

| EP | 1080756 A2 | 3/2001 |
| JP | 2000093648 A | 4/2000 |
| JP | 2000126448 A | 5/2000 |
| JP | 2001137537 A | 5/2001 |
| JP | 2007075606 A | 3/2007 |
| JP | 2007244741 A | 9/2007 |

OTHER PUBLICATIONS

International Application No. PCT/JP2009/068128, International Search Report (Jan. 19, 2010).

* cited by examiner

*Primary Examiner* — David L Lewis
*Assistant Examiner* — Chase Leichliter
(74) *Attorney, Agent, or Firm* — Edwards Wildman Palmer LLP; James E. Armstrong, IV; David A. Tucker

(57) ABSTRACT

There is provided a game system which is configured such that, while preserving the significance of an enemy character which appears during a game, a battle with the enemy character can be avoided.
The game system 1 comprises a battle determination portion 13b making a player select whether or not a battle between a player character PC and a monster M is going to be retained, a battle game execution portion 13c to execute a battle game when it is selected that the battle is not retained, a stock character setting portion 13d to set the monster M which has appeared as the stock monster SM without executing the battle game when it is selected the battle is going to be retained, and a stock battle game execution portion 13g to execute a stock battle game where the monster M set as the stock monster SM is set as a competitor when a predetermined stock battle operation is performed by the player.

13 Claims, 17 Drawing Sheets

GAME SYSTEM, GAME MACHINE AND GAME PROGRAM

CROSS-REFERENCE TO RELATED APPLICATIONS

This application is the national phase application pursuant to 35 U.S.C. §371 of International Application No. PCT/JP2009/068128, filed Oct. 21, 2009, which claims the benefit of priority of Japanese Patent Application No. JP 2008-315947, filed Dec. 11, 2008. These applications are hereby incorporated herein by reference in their entireties.

TECHNICAL FIELD

The present invention relates to a game system, a game machine, and a game program for executing a game in which a player character battles an enemy character while travelling in a game field.

BACKGROUND ART

There is already well known a game system configured such that a player character, an operation object of a player, is made to travel in a game field, and starts a battle with an enemy character which the player character encounters while traveling.

CITATION LIST

Patent Literature

PTL 1: JP-A-2000-093648.

SUMMARY OF INVENTION

Problem to be Solved by Invention

However, in the conventional game, each time when the player character encounters the enemy character, a battle image for battling the enemy character is forcibly displayed. Therefore, it is not impossible to avoid the battle game. Accordingly, even if the player wishes to make the player character go ahead, the whish is not reflected. The player can not make the player character go ahead as his/her whish. That could make the player feel a kind of stress. On the other hand, if the player can just only avoid the battle with the enemy character the player character encountered, the existence of the enemy character is not significant.

Then, the present invention aims to provide a game system and the like which is configured such that a battle with the enemy character can be avoided while preserving a significance of the enemy character which appears during the game.

Solution to Problem

A game system as one aspect of the present invention addresses the above problem by being configured as a game system comprising: a display portion to display a game image; an operation input portion to accept operations by a player; and a display information storage portion to store display information where a display point at which an enemy character is displayed in a game field where a player character can travel and the enemy character are correlated with each other, where a game is executed such that the player character is moved in the game field displayed in the game image, and when the player character and the enemy character have a predetermined relation with each other, a battle game is started between the player character and the enemy character, wherein the game system further comprises: an enemy setting portion to set the enemy character to be made to battle the player character in the battle game based on the position of the player character and the display point; a battle determination portion to make the player select whether or not a battle between the player character and the enemy character is retained; a battle game execution portion to execute, in a case that not-retaining the battle is selected by the player, the game between the player character and the enemy character: a stock character setting portion to sets as the stock character, the enemy character set by the enemy setting portion without executing the battle game; and a stock battle game execution portion to execute, when an operation for making the player character battle the stock character is performed by the player, a stock battle game using as a competitor, the enemy character set as the stock character.

According to the game system of the present invention, after the enemy character as a competitor of the battle game is set by the enemy setting portion, by the battle determination portion, it is possible to make a player select whether a battle with the enemy character gets retained or not. In a case that it is selected that the battle gets retained, by the stock character setting portion, the enemy character set as the competitor is set as the stock character. After that, when an operation for executing a battle with the stock character is performed by the player at an arbitrary timing, by the stock battle game execution portion, the stock battle game between the stock character and the player character is executed. Accordingly, in the game system of the present invention, it is possible to retain the battle with the enemy character which the player character encounters during the game, and possible to execute the battle with the enemy character retained at an arbitrary timing. Thereby, realized is the game system which is configured such that, while preserving the significance of an enemy character set as a competitor during a game, a battle with the enemy character can be avoided.

The specific means that the battle determination portion makes the player select includes, for example, a case that a branches list is displayed in the display portion and the player is made to select his/her desired one of the branches, and a case that a player is made to operate a predetermined operation corresponding to his/her desired branch. The specific means for "being set as the stock character" includes, for example, a case that a flag indicating a stock character is added to identification information for identifying an enemy character, and a case that a storage portion for storing stock characters is prepared to store the identification information for identifying an enemy character set as the stock character in the storage portion. The processes of well-known battle games where the enemy character and the player character battles each other may be applied to the processes for realizing battles in the "battle game" and the "stock battle game".

"To have a predetermined relation" includes a case that the player character comes close to, becomes adjacent to, or contacts the enemy character displayed in the game field, a case that the enemy character is not displayed until the player character reaching a predetermined point, and when the player character reaching the predetermined point, the enemy character is displayed, and when the player character reaching a predetermined point, after switching the game image to a battle image for battling the enemy character, the enemy character is displayed. In the case that the enemy character is displayed when the player character reaching the predetermined point, and that when the player character reaching the predetermined point, after switching the game image to the battle game image for executing the battle game, the enemy character is displayed, the timing when the battle determination portion makes the player select a branch is either after or before the moment when the enemy character is displayed. Moreover, the timing when the battle determination portion makes the player select a branch may be anytime until the battle game ends. For example, the timing may be immediately after moving into the battle game mode by switching the game image to the battle game image and immediately before a process for executing the battle game, or may be the moment while the battle game is executed from the start of the battle game up to the end of the battle game.

"The game field" of the present invention may be an area set as an area where the player character can travel. For example, "the game field" may be map information having some land forms and some towns or may be an inorganic space. The stock battle game execution portion may execute "the stock battle game" where the competitor is the stock character, which is only one different point, comparing to "the battle game" to be executed by the battle game execution portion, or may execute "the stock battle game" which is different from "the battle game" to be executed by the battle game execution portion in also processes for realizing a battle game.

The game system may further comprise a display change portion which changes a state of predetermined display in the game image depending on the number of enemy characters set as the stock monsters. Thereby, it is possible to reflect the state of stock character the battle of which is retained on the game image, and the state of predetermined display includes, for example, a case that the state is displayed as a gauge or a numeral indicating the number of stock characters, and a case that the state is displayed by colors or motions of the player character.

A plurality of competitor frames may be prepared, each of the competitor frames corresponding to a competitor in the stock battle game, and being correlated to at least one stock character, the stock character setting portion may correlate the enemy character set as the stock character to the competitor frame to which no stock characters are correlated out of the plurality of competitor frames, and the stock battle game execution portion may specify any one of the competitor frames as a competitor, and may execute the stock battle game between the stock character correlated to the competitor frame specified and the player character.

Thereby, in the stock battle game, as the competitor is determined in units of the competitor frame, the competitor frame functions as a unit of competitor. "the competitor frame" is a concept indicating a unit to function as the competitor of the player character in the stock battle game. Each of the competitor frames may be identified by identification information unique to each competitor frame, or identified by a place where each competitor frame is stored. The competitor frame may be specified, for example, by a player's selection, at random, or the like.

Moreover, the game system of the present invention may further comprise a group generation portion which, when a predetermined condition is satisfied in the game, generates at least one group constituted by the stock characters correlated to each of the plurality of competitor frames, and correlates the group generated to the competitor flame.

Thereby, at the moment when the enemy character is set as the stock character, one stock character is correlated to one competitor frame. As the competitor is selected in units of competitor frame, the stock character itself is set to be the competitor in the stock battle game. On the other hand, when a predetermined condition is satisfied, the stock characters are grouped, and to the group the competitor frame is correlated. Accordingly, in this case, the stock characters becomes the competitor in units of groups, and the plurality of stock characters grouped into one group can be set to be the competitor of the player character. The predetermined condition is just a trigger for the group generation portion to generate a group, such as, an occurrence of an event and a predetermined elapsed time.

The game system may further comprises a time counting portion which, with respect to each stock character, counts elapsed time after the moment when the enemy character is set as the stock character, wherein the group generation portion may generate at least one group by the stock characters the elapsed time of which has been beyond a predetermined time. Thereby, based on elapsed time after the set of stock character as a criterion, the stock characters can be grouped.

The group generation portion may generate the plural groups so that the number of enemy characters included in each group is not beyond a predetermined maximum number, and may correlate each of the plural groups to the competitor frame. Thereby, it is possible to confine the number of the stock characters included in each group.

The game system may comprise an enemy character information storage portion which stores enemy character information where enemy character identification information for identifying the enemy character and at least one battle parameter to be used in the battle game are correlated to each other, wherein the group generation portion may calculate values of battle parameters for the group to be generated based on values of the battle parameters of the stock characters constituting the group to be generated, and the stock battle game portion, when the group is selected as the competitor, may use the values of battle parameters for the group as the values of battle parameters for the competitor. Thereby, it is possible to set for the group constituted by plural enemy characters, parameter values characteristic of the group based on the parameter values of each enemy character. "the battle parameters" are parameters to be used in the battle game and the stock battle game, such as, a life value and the like which change depending on the state of game, besides a constant attack ability value and a constant power ability value.

The game system may further comprise a unit process portion which, when the maximum number of stock characters are correlated to each of all competitor frames included in a competitor unit, correlates to the competitor unit, the stock characters more than a total of the stock characters included in the competitor unit, and sets as the competitor frame, the competitor unit to which the stock characters more than the total are correlated. Thereby, it is possible to change the way of increasing the enemy characters, which can provide a unexpected game progress.

The game system may further comprise a landform information storage portion which stores a position in the game field and landform information of the position, to the enemy character, specific landform information in which the landform information having a specific relation with the enemy character is set, may be correlated and the game system may further comprise a specific landform process portion which, when a position of the player character and a position indicated in the land information have a predetermined relation, detects the stock character to which the landform information is correlated as the specific landform, and executes a process depending on the specific relation when the stock character is detected.

Thereby, it is possible to provide a mode that the stock characters originates not only from the enemy characters retained, but also the number of stock characters increases and decreases depending on a landform. "A predetermined relation" includes a case that the relation between the position of the player character and the position indicated by the landform information is within a predetermined range, a case that the position of the player character has passed through the vicinity of the position indicated by the landform information, and the like. "A specific relation" includes a relation that the enemy character is good at the corresponding landform and a relation that the enemy character is weak at the corresponding landform. As "a process depending on the specific relation", with respect to a case of being good at landform, a process of increasing the number of stock monsters, a process of increasing the battle parameters' values of the stock character, or the like, and with respect to a case of being weak at landform, a process of decreasing the number of stock characters, a process of decreasing the battle parameters' values of the stock character, or the like.

The game system may have: a player terminal machine including the display portion and the operation input portion; and a server including the display information storage portion and a game control portion which executes, in reply to operations by the player of the player terminal machine, the game where the player character is moved in the game field displayed in the game image, and the battle game is started between the player character and the enemy character set as the competitor, wherein the enemy setting portion, the battle determination portion, the battle game execution portion, the stock character setting portion, and the stock battle game execution portion may be provided in the game control portion of the server. Thereby, for example, if the memory area where the stock characters are retained is provided to the server as a memory area common to plural players, it is possible to provide a game system where the stock character can be used by the plural players equally. Moreover, by correlating the stock character to a player ID and administering it in the server, it is possible to provide when the predetermined condition is satisfied, the game system where one player's stock character can be changed into another player's stock character.

A game program of one aspect of the present invention addresses the above problem by being configured as a game program which makes a computer execute a game such that a player character is moved in a game field displayed in a game image and when the player character and an enemy character have a predetermined relation with each other, a battle game is started between the player character and the enemy character, the computer comprising: a display portion to display the game image; an operation input portion to accept operations by a player; and a display information storage portion to store display information where an display point at which the enemy character is displayed in the game field where the player character can travel and the enemy character are correlated with each other, wherein the game program is configured to make the computer function as: an enemy setting portion to set the enemy character to be made to battle the player character in the battle game based on the position of the player character and the display point; a battle determination portion to make the player select whether or not a battle between the player character and the enemy character is retained; a battle game execution portion to execute, in a case that not-retaining the battle is selected by the player, the game between the player character and the enemy character: a stock character setting portion to sets as the stock character, the enemy character set by the enemy setting portion without executing the battle game; and a stock battle game execution portion to execute, when an operation for making the player character battle the stock character is performed by the player, a stock battle game using as competitor, the enemy character set as the stock character.

By making the computer run the game program of the present invention, it is possible to realize the game system of the present invention.

A game machine of the present invention addresses the above problem by being configured a game machine A game machine comprising: a display portion to display a game image; an operation input portion to accept operations by a player; and a display information storage portion to store display information where an display point at which an enemy character is displayed in a game field where a player character can travel and the enemy character are correlated with each other, where a game is executed such that the player character is moved in the game field displayed in the game image, and when the player character and the enemy character have a predetermined relation with each other, a battle game is started between the player character and the enemy character, wherein the game machine further comprises: an enemy setting portion to set the enemy character to be made to battle the player character in the battle game based on the position of the player character and the display point; a battle determination portion to make the player select whether or not a battle between the player character and the enemy character is retained; a battle game execution portion to execute, in a case that not-retaining the battle is selected by the player, the game between the player character and the enemy character: a stock character setting portion to sets as the stock character, the enemy character set by the enemy setting portion without executing the battle game; a stock battle game execution portion to execute, when an operation for making the player character battle the stock character is performed by the player, a stock battle game using as a competitor, the enemy character set as the stock character; and a communication portion to transmit to another game machine, information of enemy character set as the stock character.

The game machine of the present invention has the same constructions as the game system of the present invention, and further has the communication portion capable of communicating the other game machine. At the communication portion, the information of enemy character set as the stock character is transmitted. Namely, it is possible to provide the other game machine with the stock character of the game machine. Thereby, the stock character set in the game machine can be also used in the other game machine. The timing of transmission may be constructed such that when a predetermined condition is satisfied in the game, the information of any stock character is transmitted, or each time when the enemy character is set as the stock character, the information of the stock character is transmitted.

For example, the game system may be configured such that when the communication portion of the game machine obtains from the another game machine, the information of the enemy character set as the stock character of the another game machine, the stock battle game execution portion executes the stock battle game by using as the competitor, the obtained enemy character set as the stock character. Thereby, it is possible to realize a mode that the stock character set in one game machine is used as the competitor in the stock battle game of the another game machine. For example, when the game system is constructed such that the transmitted information of the stock character is deleted at the game machine from which the information of the stock character was transmitted, it is possible to realize a mode that the stock character is robbed of by the another game machine. Moreover, if the game system is constructed such that the information is not deleted even if transmitted, it is possible to realize a mode that the stock character set in one game machine can also be used in common in the another game machine. In addition, well-known communication system may be applied to a system for communicating data between the game machines. For example, the system of using an open network like the internet may be applied, or the peer-to-peer system like an ad-hoc communication may be applied.

Effects of the Invention

As mentioned above, according to the present invention, after the enemy character is set as the competitor, a player is made to select whether the battle between the player character and the enemy character is retained or not. In a case that retaining the battle is selected, the enemy character set as the competitor is set as the stock character, and after that, executed is the stock battle game by using the enemy character set as the stock character as the competitor. Thereby, it is possible to provide a game system which is configured such that, while preserving the significance of an enemy character which appears during a game, a battle with the enemy character can be avoided and a game program thereof.

EMBODIMENT FOR EXECUTING INVENTION

Figure 1:
[FIG. 1] A diagram showing a game image where a player character travels in a game map.

FIG. 1 shows a game image GI of a game system of the present invention. In the game image GI, a player character PC which moves in reply to operations by a player, and, in a back ground of the player character PC, a part of a game map GM as a game filed are displayed. In the game system of the present invention, the player character travels on the game map GM in reply to the operations by the player, and when at least one monster M appears at a predetermined point, the game moves into a state where a battle between the player character PC and the monster M can be started. However, in the present invention, even when the monster M appears at the predetermined point, it is possible to retain the battle with the monster M.

Figure 2:
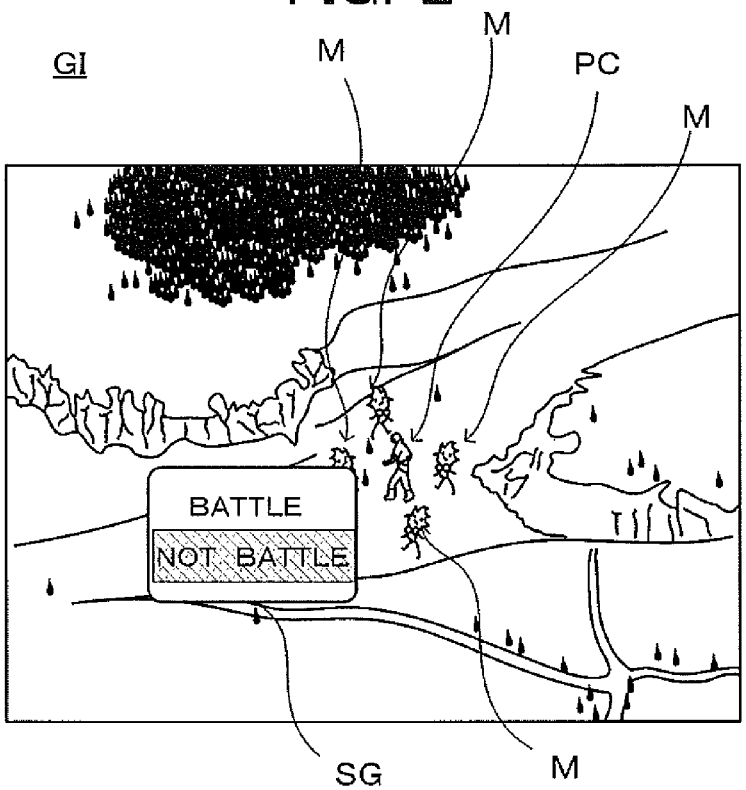
[FIG. 2] A diagram showing a game image where a process selection image is displayed with the appearance of monsters.
Figure 3:
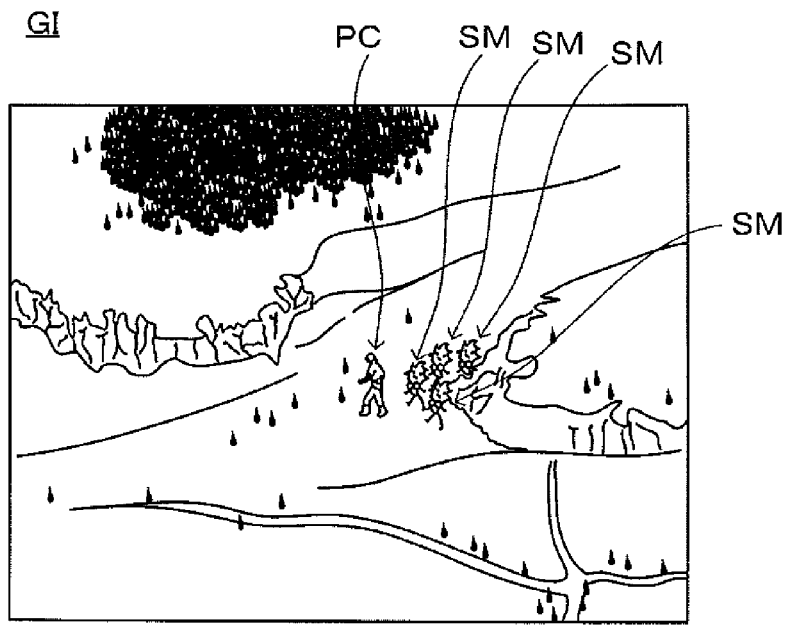
[FIG. 3] A diagram showing a game image where stock monsters following the player character are displayed.

When the monster M appears, as displayed in the game image GI shown in FIG. 2, a process selection image SG which prompts the player to select his/her desired process is displayed. In a case that "BATTLE" is selected, the battle game is started. In a case that "NOT BATTLE" is selected, the monster M which has appeared is set as a stock monster SM and the battle is retained. The stock monster SM travels together with the player character PC as displayed in the game image GI shown in FIG. 3. FIG. 2 shows a state that four monsters M have appeared, and FIG. 3 shows a state that the four monsters M have changed into the stock monsters SM. This game is designed such that, by performing a battle start operation at player's desired timing, a battle (hereinafter, referred to as "the stock battle") between the play character PC and the stock monster SM can be started. The stock battle of the present invention is a turn-taking game where the competitor and the player character PC attack alternately.

As mentioned above, in the present invention, it is not necessary that the player character PC battles immediately the monster M which has appeared while the player character PC traveling on the game map GM. It is possible to retain the battle and to start the stock battle at the player's desired timing. However, when a predetermined time (one minute in this embodiment) elapses from the moment when the stock monster SM is set, the stock monster SM is grouped with the other stock monsters SM. In this case, the player character PC executes a stock battle with a group of the stock monsters SM as the competitor. Moreover, in the present embodiment, the game is designed such that, when ten minutes elapse from the moment when the stock monster SM is set, a boss monster BM corresponding to the stock monster SM appears on the game map GM. Additionally, by referring to a stock information storage portion 12c, the game may be designed such that the time from the moment when the stock monster SM is set until the moment when the boss monster BM appears changes depending on the number of stock monsters SM. For example, a correlation between the number of the stock monsters SM and the time has been stored in a storage portion 12 in advance, and at the moment of setting the stock monster SM, by referring this correlation, the remaining time before the moment when the boss monster BM appears may be specified.

Figure 4:
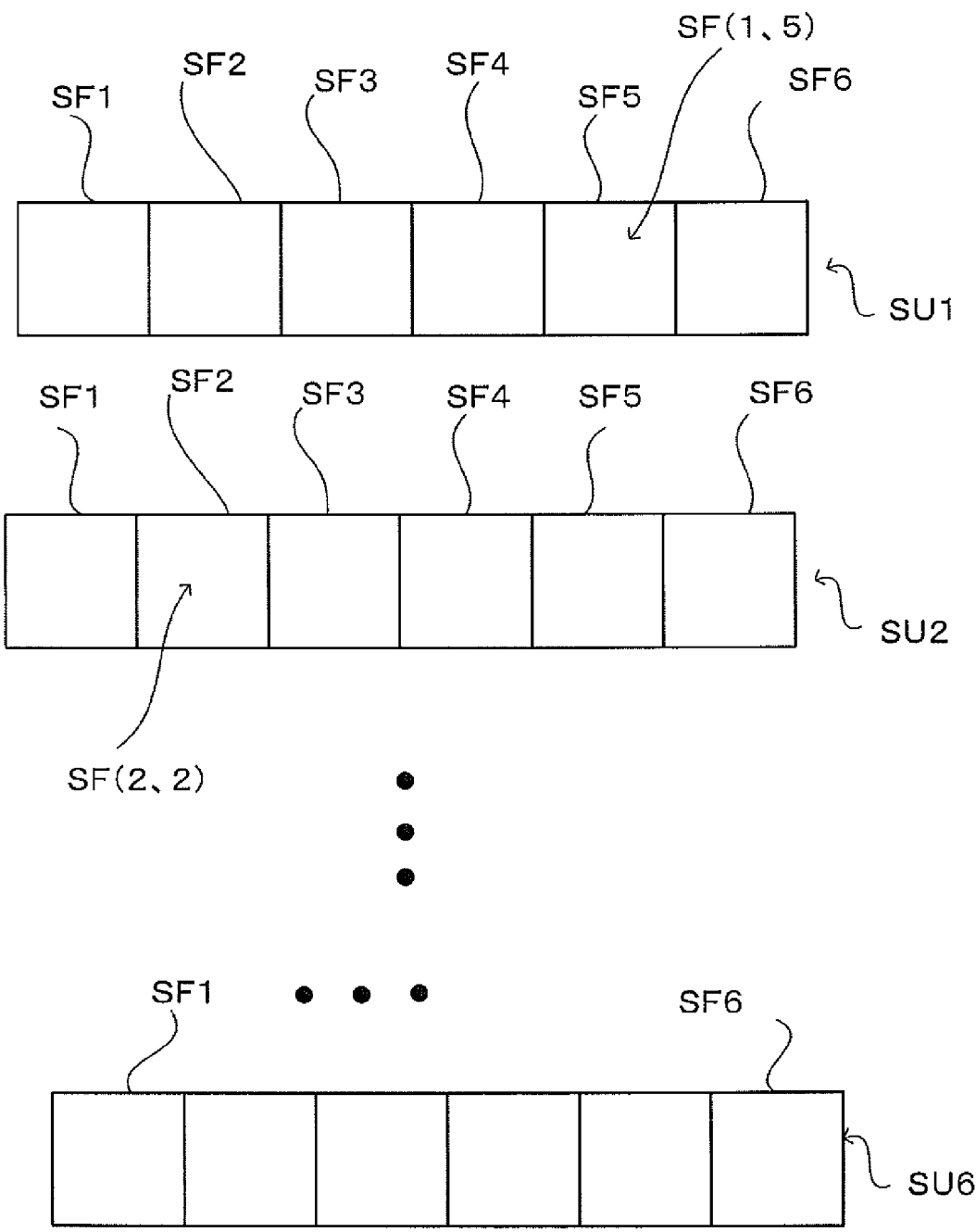
[FIG. 4] A diagram showing a configuration of a stock frame of the present embodiment.

It will be described how to group the stock monsters SM. In the game system 1, as shown in FIG. 4, stock frames SF1 to SF6 are prepared as competitor frames. Each of the stock frames SF1 to SF6 functions as a unit of selection as a competitor of the player character PC at the stock battle. Each of the stock frames SF1 to SF6 is correlated to at least one stock monster SM. Moreover, in the present embodiment, the six stock frames SF1 to SF6 form one unit, and the six stock units SU1 to SU6 are prepared in total.

Hereinafter, when it is not necessary to distinguish each of the stock frames SF1 to SF6, each is referred to as the stock frame SF, and when it is not necessary to distinguish each of the stock units SU1 to SU6, each is referred to as the stock unit SU. Each stock frame SF is specified by the number of the stock unit SU and the number of the stock frame SF. For example, the stock frame SF5 in the stock unit SU1 is referred to as SF(1,5), and the stock frame SF2 in the stock unit SU2 is referred to as SF(2,2).

In the present embodiment, up to six stock monsters SM can be correlated to one stock frame SF. Accordingly, up to thirty-six stock monsters SM can be correlated to one stock unit SU. In a case that not less than two stock monsters SM are correlated to one stock frame SF, the group constituted by the not less than two stock monsters SM will be set as the competitor of the player character PC in the stock battle. Namely, in a case that plural stock monsters SM are grouped, the group will be set as the competitor.

Figure 5A:
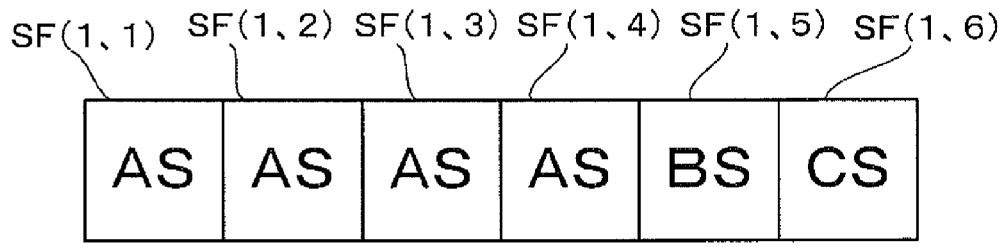
[FIG. 5A] A diagram showing a state that each of the stock monsters is set in each of the stock frames.

When the monster M changes into the stock monster SM, the stock monster SM is correlated to a stock frame SF where no stock monster SM is correlated (hereinafter "to be registered on" is sometimes used). For example, in a case that at a predetermined appearance position on the game map GM, four A-monsters AM, one B-monster BM and one C-monster CM appear and the player character retains the battle with them, all of the monsters M change into the stock monsters SM. In this case, as shown in FIG. 5A, the four A-stock monsters AS is registered on the stock frames SF(1,1) to SF(1,4) respectively, one B-stock monster BS is registered on the SF(1,5), and C-stock monster CS is registered on the SF(1, 6).

Figure 5B:
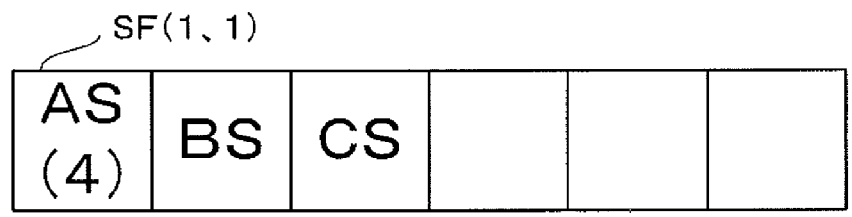
[FIG. 5B] A diagram showing a state that A stock monsters are grouped.

After that, when the state stock monsters SM are registered on the stock frames SF respectively is maintained for not less than one minute, the stock monsters SM of the same type are grouped, and registered on one stock frame SF (for example, the stock frame SF on which the stock monster SM to be grouped has been registered). FIG. 5B shows a state that four pieces of A-stock monsters AS are grouped and registered on the SF(1,1). On the other hand, with respect to B-stock monster BS and C-stock monster CS each of which does not exist plural stock monsters of the same type, even if a state that they are registered on the stock frames SF respectively is maintained for not less than one minute, the state remains.

Figure 5C:
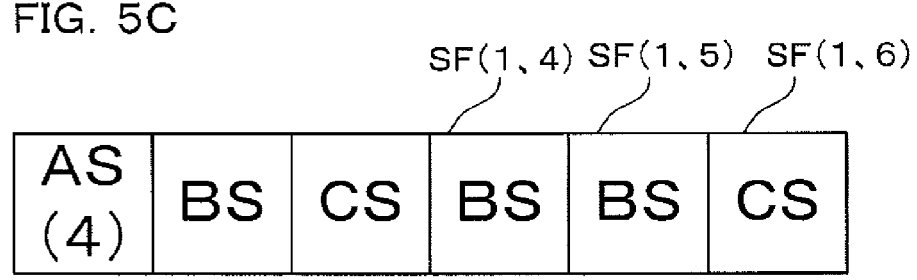
[FIG. 5C] A diagram showing a state that further stock monsters are set in the stock frames in addition to the state shown in FIG. 5B.

Subsequently, for example, in a case that two B-monsters BM and one C-monster CM appear and the battle with them is retained, each monster M changes into a stock monster SM, and as shown in FIG. 5C, the two B-stock monsters are registered on SF(1, 4) and SF(1.5) respectively, and the one C-stock monster is registered on SF(1,6).

Figure 5D:
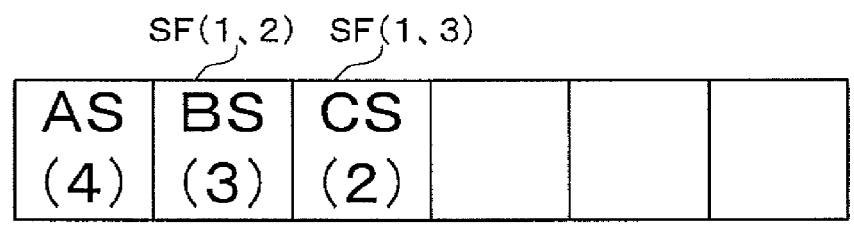
[FIG. 5D] A diagram showing a state that B stock monsters and C stock monsters are grouped respectively.

After that, with respect to each of the stock monsters SM, when a state that each of them is registered on each stock frame SF is maintained for not less than one minute, the stock monsters of the same type are grouped and correlated to one stock frame SF. In FIG. 5D, three B-stock monsters BS are grouped and registered on SF(1,2), and two C-stock monsters CS are grouped and registered on SF(1,3).

Figure 5E:
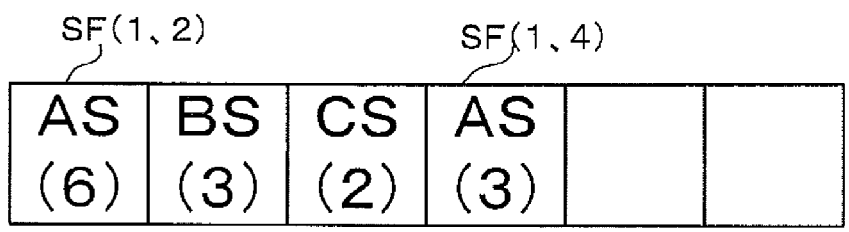
[FIG. 5E] A diagram showing a state that A stock monsters are grouped in addition to the state shown in FIG. 5D.

As mentioned above, up to six stock monsters SM can be registered on each stock frame SF. Accordingly, for example, at the moment of the state shown in FIG. 5D, new five A-stock monsters are grouped, as shown in FIG. 5E, by adding new two A-stock monsters to SF(1,1), the registered number of SF(1,1) becomes six, and the other three A-stock monsters AS are collectively registered on SF(1,4). After the stock battle with the player character PC, a defeated stock monster SM or a defeated group is deleted from the corresponding stock frame SF.

In addition, in the present embodiment, with respect to all of the stock frames SF1 to SF6 constituting one stock unit SU, in a case that same-type six, the maximum number, stock monsters SM are correlated to each stock frame SF, 100 pieces of the stock monsters SM are correlated to the stock unit SU as one expansion group.

Figure 6:
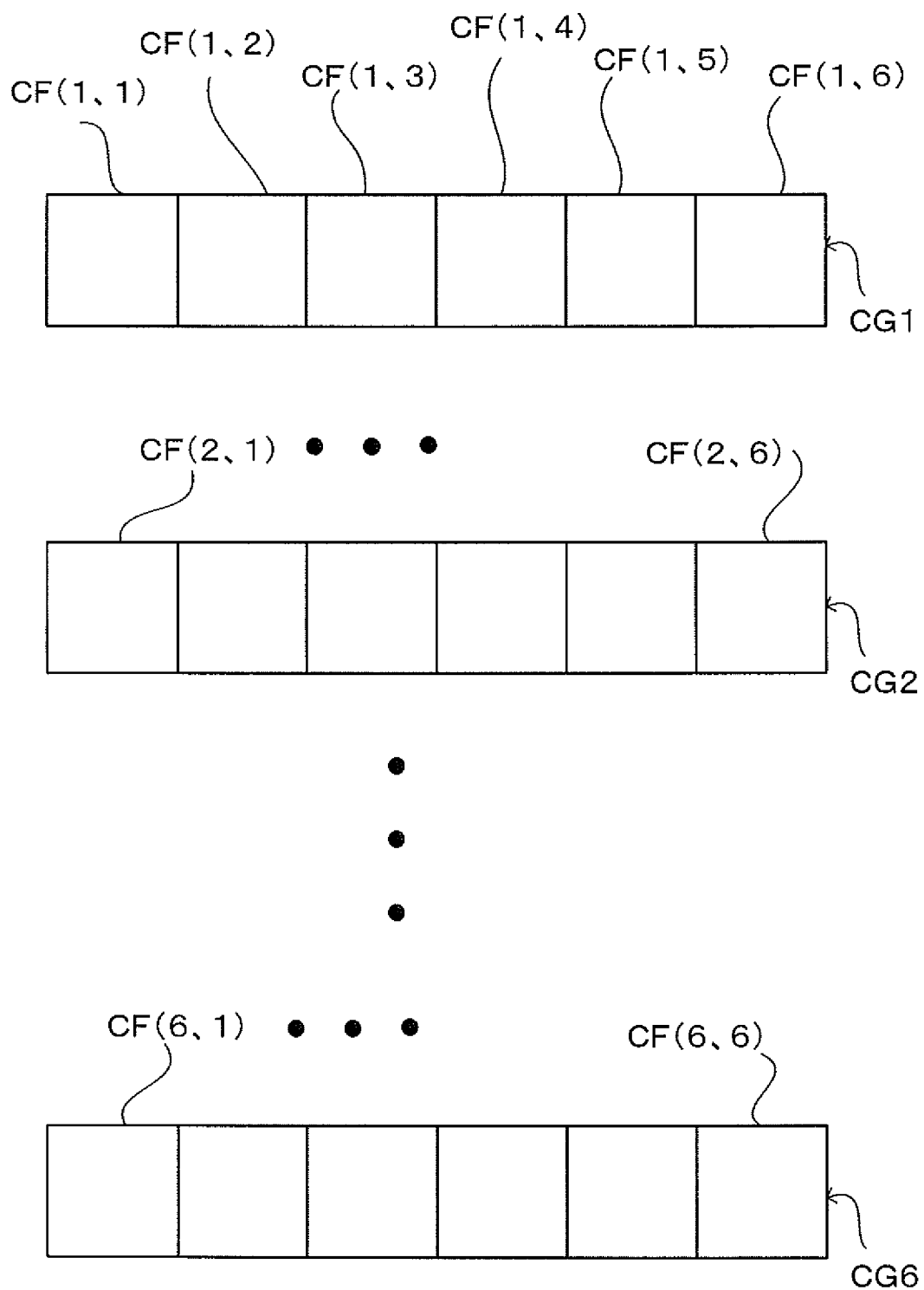
[FIG. 6] A diagram showing a configuration of a character frame of the present invention.

Moreover, in the present embodiment, by setting a plurality of player characters PC, it is possible to put on the stock battle between the plurality of player characters PC and the stock monsters SM or the group of stock monsters SM. For example, as shown in FIG. 6, by providing character frames CF corresponding to a plurality of play characters PC respectively, a predetermined stock frame SF may be correlated to a predetermined character frame CF as a competitor. This correlation may be executed by the player's operation, may be executed by the game system based on a chemistry of attribute between the character frame CF and the stock frame SF, or may be executed by the game system randomly.

In the present embodiment, six character frames CF1 to CF 6 constitute one character group CG. Up to six character groups CG1 to CG6 can be set as the character group CG of the present invention, Namely, up to 36 player characters PC can be set.

Figure 7:
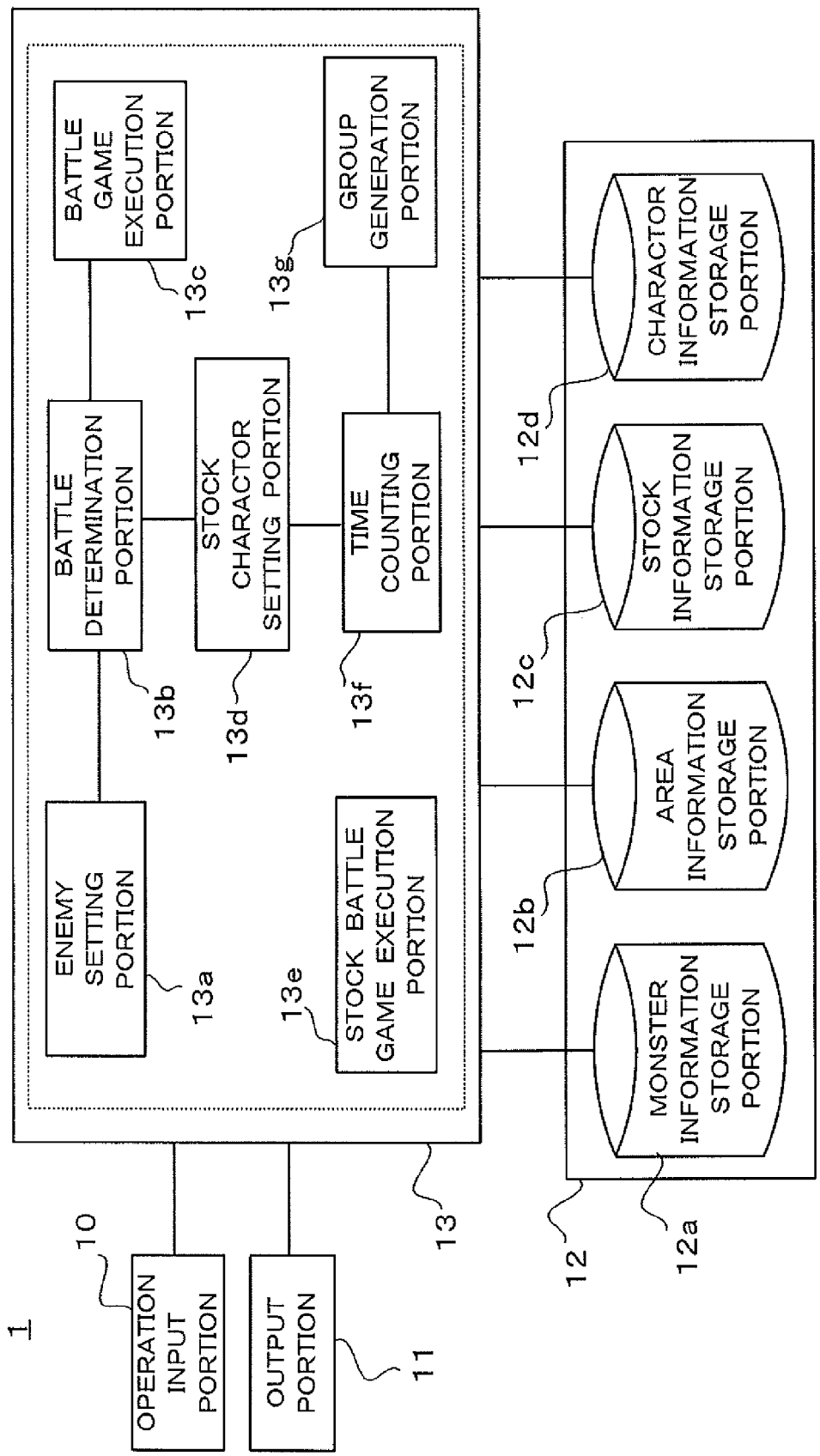
[FIG. 7] A diagram showing one example of a hardware configuration of the game system.

Hereinafter, specific processes executed in the game system 1 for realizing the above concept will be described. First, FIG. 7 shows a hardware configuration of the game system 1 of the present embodiment. The game system 1 comprises an operation input portion 10 to accept operations by a player, a output portion 11 including a monitor and a speaker, a storage portion 12 storing computer programs and various kinds of data, and a game control portion 13 to control processes executed in the game system 1. The game control portion 13 comprises a CPU and a memory area including a RAM, a ROM and the like necessary for operations of the CPU.

The game control portion 13 functions mainly as an enemy setting portion 13a, a battle determination portion 13b, a battle game execution portion 13c, a stock character setting portion 13d, a time counting portion 13f, a group generation portion 13g, and a stock battle game execution portion 13e. The process executed by each portion will be described later.

Figure 8:
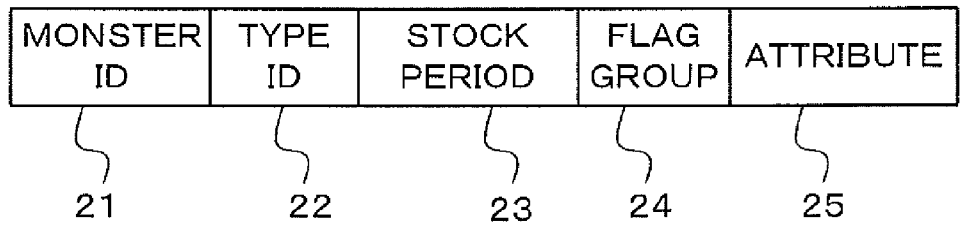
[FIG. 8] A diagram showing a data construction of monster information.

In the storage portion 12, as well as the game programs, a monster information storage portion 12a, an area information storage portion 12b, a stock information storage portion 12c, and a character information storage portion 12d are included. The information stored in each storage portion 12a to 12d will be described. As shown in FIG. 8, the monster information 20 is constructed such that a type ID 22 indicating a type of the monster, a stock period 23 indicating elapsed time from the moment when the monster M changes into a stock monster SM, a flag group 24 including various kinds of flags and attribute 25 indicting the other attributes of the monster M are correlated to a monster ID 21 for identifying the monster M.

In the attribute 25, for example, as well as parameters to be used at the battle (hereinafter, sometimes referred to as "the battle parameters") such as an attack ability value, and a life value, specific landform information is also set, the specific landform information indicating the landforms which the monster M is good at and weak at. Thereby, the monster information storage portion 12a functions as an enemy character information storage portion. The landform information is information indicating a predetermined landform on the game map GM such as lakes, mountains, rivers, and ponds. Also, the monster ID 21 of the boss monster BM corresponding to the monster M is also set in the attribute 25. In the flag group 24, a stock flag indicating that the monster M has been set as the stock monster SM, a group flag indicating that the monster M has been grouped and the like are included. The monsters M having the same type ID 22 are treated as the monsters M of the same type. In addition, the monster ID 21 may be set by combining the monster ID 21 and the type ID 22.

Figure 9:
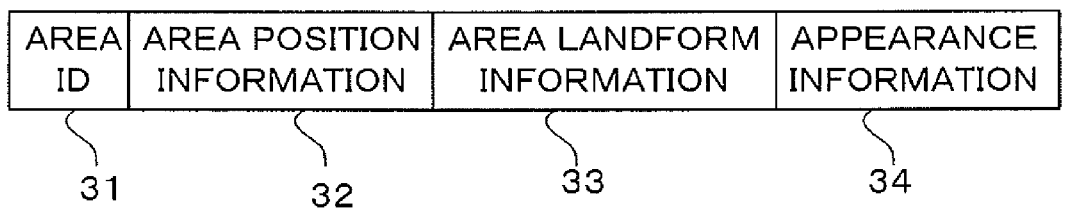
[FIG. 9] A diagram showing a data construction of area information.
Figure 10:
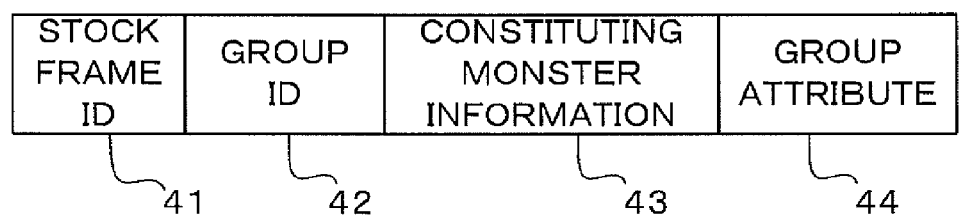
[FIG. 10] A diagram showing a data construction of stock information.

In the area information storage portion 12b, area information 30 is stored, where information with respect to each of plural areas in the game map GM is set. As shown in FIG. 9, the area information 30 is constructed such that the following information is correlated to an area ID 31 for identifying the area: area position information 32 indicating the position of the area in the game map GM; area landform information 33 indicating landform information in the area and the position of each landform; and appearance information 34 as display information in which a monster M to appear in the area and an appearance point as a display point are stored so as to be correlated with each other. Thereby, the area information storage portion 12b functions as a display information storage portion.

In the stock information storage portion 12c, stock information 40 indicating a stock state of the stock monster SM is stored. The stock information 40 is constructed such that a group ID 42, constituting monster information 43, and a group attribute 44 are correlated to a stock frame ID 41 for identifying the stock frame SF. The stock frame ID 41 is, as mentioned above, obtained by combining the number of the stock unit SU and the number of the stock frame SF.

The group ID 42 is information for identifying the group. The group ID 42 is determined such that the type of the stock monster SM of the group is also identified. In the constituting monster information 43, the monster ID 21 of the stock monster SM correlated to the stock frame SF indicated by the stock frame ID 41 is set. In a case that a group is set, plural monster IDs 21 are set in the constituting monster information 43. In the group attribute 44, the battle parameters are set, the battle parameters being used in the stock battle game when the group is set as a competitor. In a case that no group is correlated to the stock frame SF, the group ID 42 and the group attribute 44 are blank.

Figure 11:
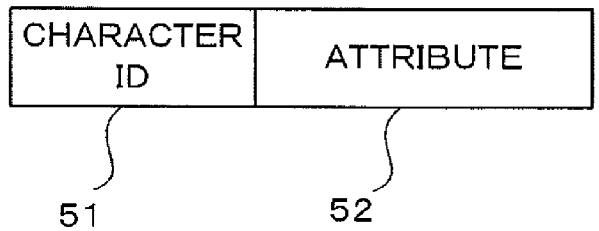
[FIG. 11] A diagram showing a data construction of character information.

In the character information storage portion 12d, character information 50 including information of each player character PC is stored. The character information 50 has, as shown in FIG. 11, a character ID 51 for identifying the player character PC and an attribute 52 of the player character PC. The attribute 52 includes battle parameters to be used in the battle game, such as a life value, an attack ability value, a power value.

Figure 12:
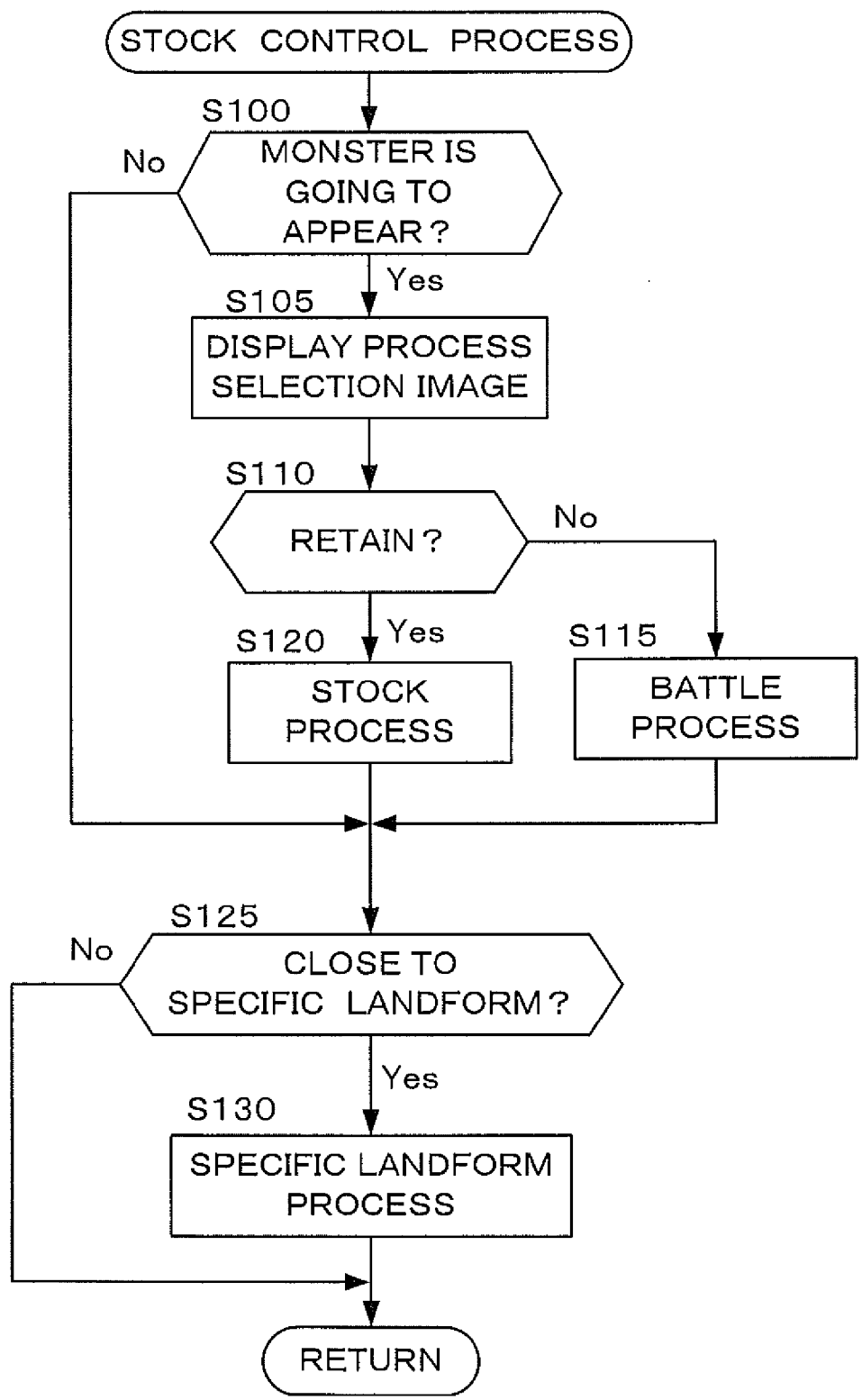
[FIG. 12] A flow chart showing a flow of processes in a stock control process.

When the player character PC travels on the game map GM, a stock control process is executed by the game control portion 13. The stock control process will be described, following a flow chart shown in FIG. 12. The stock control process is controlled by the game control portion 13. First, at step S100, it is determined whether or not a monster M is going to appear. For example, the appearance information 34 of the area information 30 corresponding to the area where the player character PC is existing is referred, and when the position of the player character PC reaches the appearance point of a monster M or enters a predetermined range from the appearance point, an affirmative determination is obtained. At least one monster M satisfying the conditions is set as a competitor, and the monster M is displayed at the appearance point. Thereby, the game control portion 13 functions as the enemy setting portion 13a. Further, in a time monitoring process which will be described later, also when the appearance of the boss monster BM is determined, the affirmative determination is obtained.

In a case that a negative determination is obtained at step S100, the process goes to step S125, and an affirmative determination is obtained, the process goes to step S105. At step S105, the process selection image SG is displayed in the game image GI to make the player select whether or not a battle game it going to be retained. Thereby, the game control portion 13 functions as the battle determination portion 13b. Subsequently, at step S110, it is determined whether or not the branch of retaining the battle game is selected. When "BATTLE" is selected by the player, a negative determination is obtained at step S110, and the process goes to step S115 to execute a battle process for executing the battle game. Thereby, the game control portion 13 functions as the battle game execution portion 13c. In the battle process, a battle image is displayed, and processes for battling the appearing monster M as the competitor are executed. To the battle process of the present embodiment, the processes for well-known game where the player character PC and the monster M battle each other alternately may be applied. Main process in the battle process will be described later. After the battle process, the stock control process goes to step S125.

On the other hand, in a case that "NOT BATTLE" is selected by the player in the process selection image SG, an affirmative determination is obtained at step S110, and the process goes to step S120 to execute a stock process. In the stock process, a process for setting the monster M as a stock monster SM is executed, the monster M having been set as the competitor, that is, having appeared in the game image GI. The details of the stock process will be described later. After the stock process, the stock control process goes to step S125.

At step S125, it is determined whether or not the player character PC has come close to a specific landform. The specific landform is a landform which is set in advance such that when the position of the play character PC and the position of the landform have achieved a predetermined relation (in the present embodiment, "coming close"), a predetermined process is executed. By referring the area landform information 33 of the area information 30, it may be determined whether or not the position of the player character PC has come close to the specific landform.

When a negative determination is obtained at step S125, the process returns to step S100 and the stock control process is repeated. In a case that an affirmative determination is obtained at step S125, the process goes to step S130 to execute a specific landform process corresponding to the landform. In the present embodiment, as the specific landform process, a process for increasing or reducing the number of stock monsters SM depending on the landform which the player character PC has come close to is executed. Thereby, the game control portion 13 functions as a specific landform process portion. The specific landform process will be described later. After the specific landform process, the stock control process returns to step S100 to be repeated.

Figure 13:
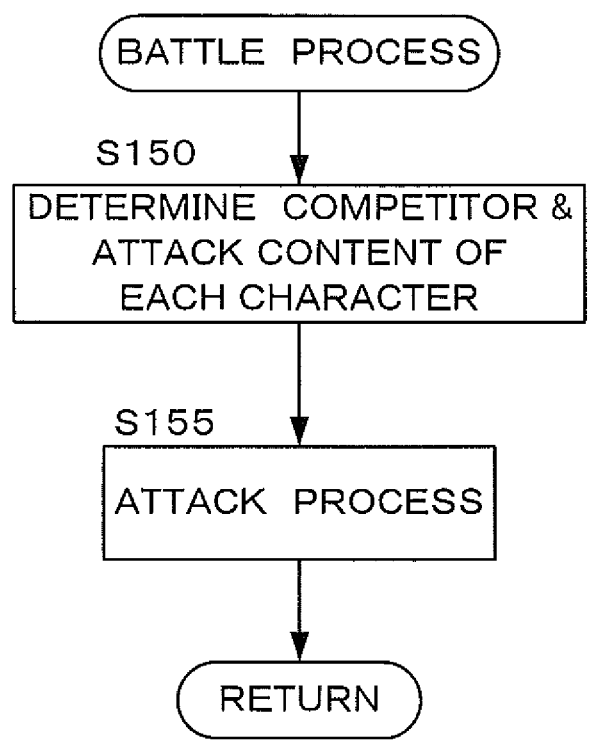
[FIG. 13] A flow chart showing a flow of processes in a battle process.

Main processes in the battle process will be described by following a flow chart shown in FIG. 13. First, at step S150, the monster M set to be a competitor of the player character PC and the attack content are determined. In a case that there are plural player characters PC, for each of the plural player characters PC, the competitor and the attack content are determined. The operations by the player leads to this determination. Next, the battle process goes to step S155 to start an attack process based on the contents determined at step S150.

In the attack process, a state that each player character PC and the monster M of the competitor attack alternately is displayed in the game image GI, and a process of an attack result depending on the attack contents of them is executed. In the attack process, the battle parameters for the player character PC and the monster M are used. As the process of the attack result, for example, when the player character PC defeats the monster M, the life value of the player character PC is increased, and when the player character PC is defeated, the life value is reduced. After the attack process, the battle process ends.

Figure 14:
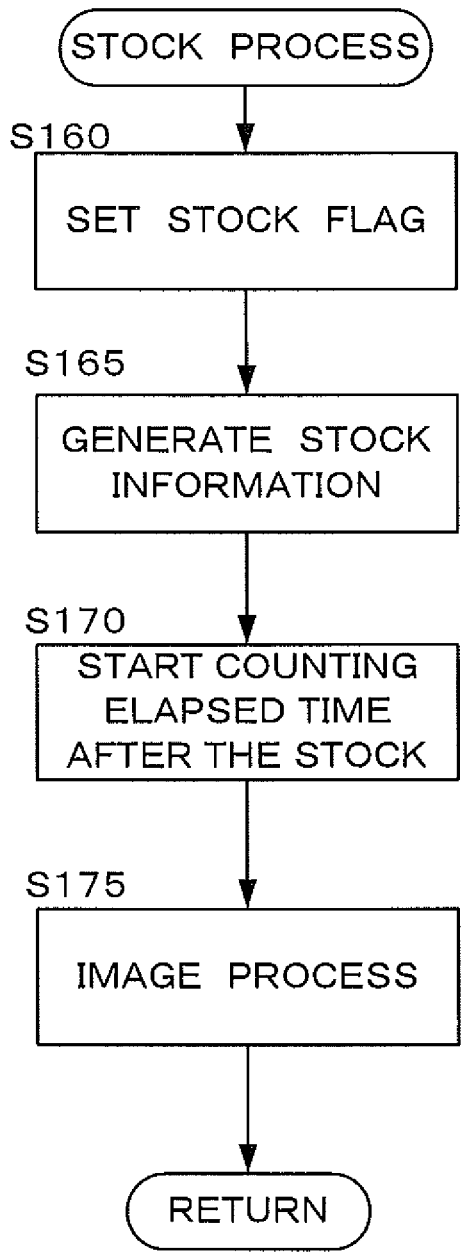
[FIG. 14] A flow chart showing a flow of processes in a stock process.

The stock process will be described by following a flow chart shown in FIG. 14. The stock process is controlled by the game control portion 13. First, at step S160, a stock flag is set, the stock flag being in the stock information 20 corresponding to the monster M set to be retained. Subsequently, at step S165, the stock information 40 is generated and stored in the stock information storage portion 12c. Thereby, the monster M is set as a stock monster SM, and the game control portion 13 functions as the stock character setting portion 13d. The stock information 40 is generated by setting in the constituting monster information 43, the monster ID 21 of the monster M set to be correlated to the stock ID 41 of a stock frame SF to which no stock monster SM is correlated (hereinafter, referred to as "the blank stock frame SF"). At the moment of generating the stock information 40, the group ID 42 is blank.

Next, the process goes to step S170 to make the time counting portion 13f start counting time. Thereby, for the stock monster SM, the elapsed time after the moment that the stock monster SM is set (hereinafter, "after the stock") is counted. Further, at step S175, the image of new stock monster SM is displayed in the game image GI. After that, in the game image GI, the image of the stock monster SM is processed such that the stock monster SM follows the player character PC. Thereby, the game control portion 13 functions as a display change portion. Then, the stock process ends.

Figure 15:
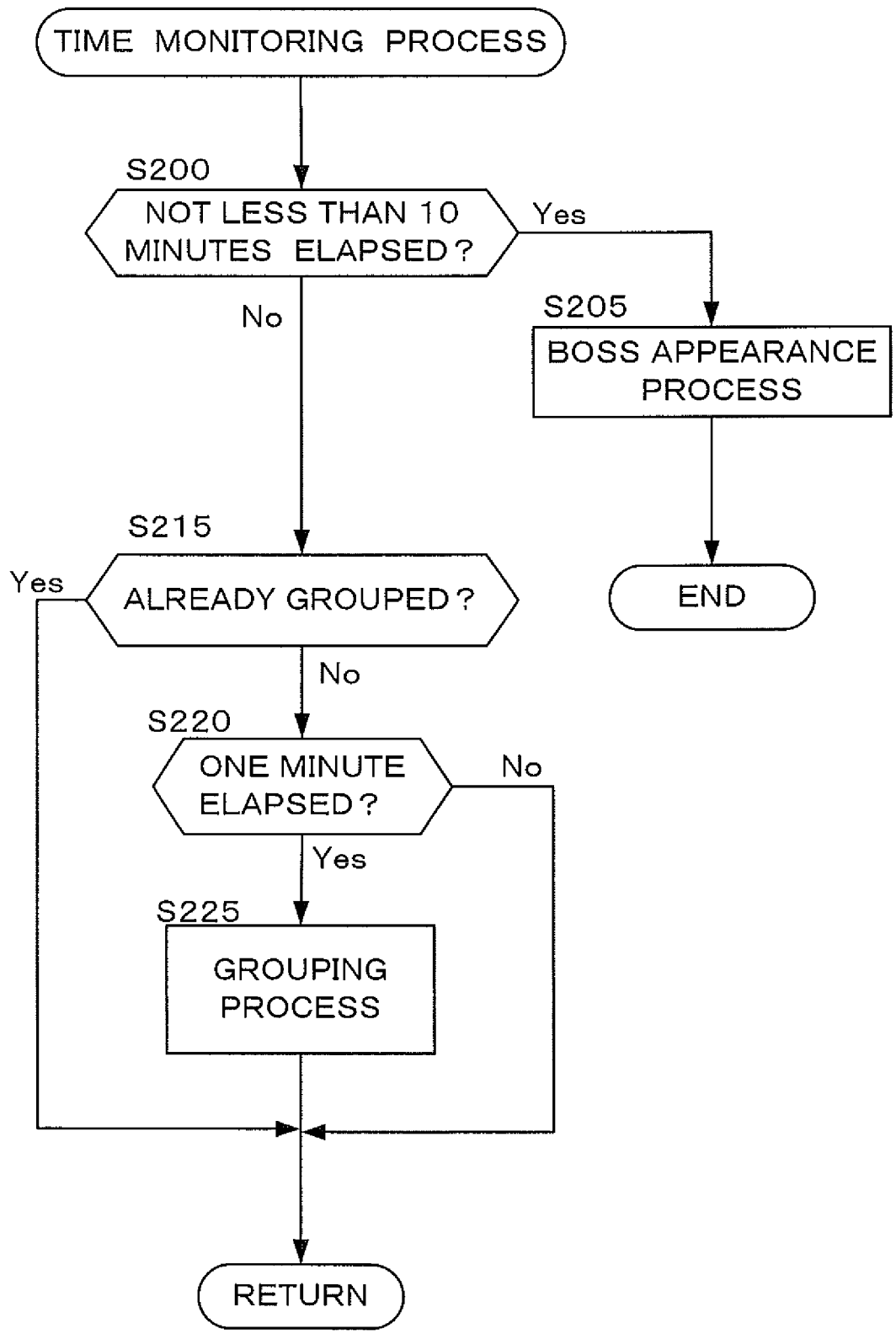
[FIG. 15] A flow chart showing a flow of processes in a time monitoring process.

As mentioned above, when the stock monster SM is set, the elapsed time after the stock is counted by the time counting portion 13f, and a time monitoring process is started, the time monitoring process being corresponding process for each stock monster SM appropriate for the elapsed time. The elapsed time counted by the time counting portion 13f is set in the stock period 23 of the corresponding stock monster SM. The time monitoring process will be described by following a flowchart shown in FIG. 15. Hereinafter, the stock monster SM means the stock monster SM which is an objet to be processed.

First, at step S200, it is determined whether the stock period 23 has become not less than 10 minutes or not. When an affirmative determination is obtained at step S200, the process goes to step S205, and when a negative determination is obtained, the process goes to step S215. At step S205, the process for making the boss monster SM of the stock monster SM appear in the game image GI, and the time monitoring process ends. The boss monster BM of the stock monster SM can be specified based on the monster ID 21 of the boss monster BM specified by referring to the attribute 25 of the stock monster SM.

At step S215, it is determined whether the stock monster SM has been grouped or not. It is determined by referring to the group flag in the flag group 24 of the stock monster SM. When an affirmative determination is obtained at step S215, the process returns to step S200 to repeat the time monitoring process. When a negative determination is obtained at step S215, the process goes to step S220, and it is determined whether or not not less than one minute has elapsed since the stock period started.

At step S220, a negative determination is obtained, the process returns to step S200 to repeat the time monitoring process. When an affirmative determination is obtained at step S220, the process goes to step S225 to execute a grouping process. By the grouping process, the stock monster SM is grouped with other stock monsters SM. The grouping process will be described later. After the grouping process, the time monitoring process returns to step S200 to repeat the time monitoring process.

Figure 16:
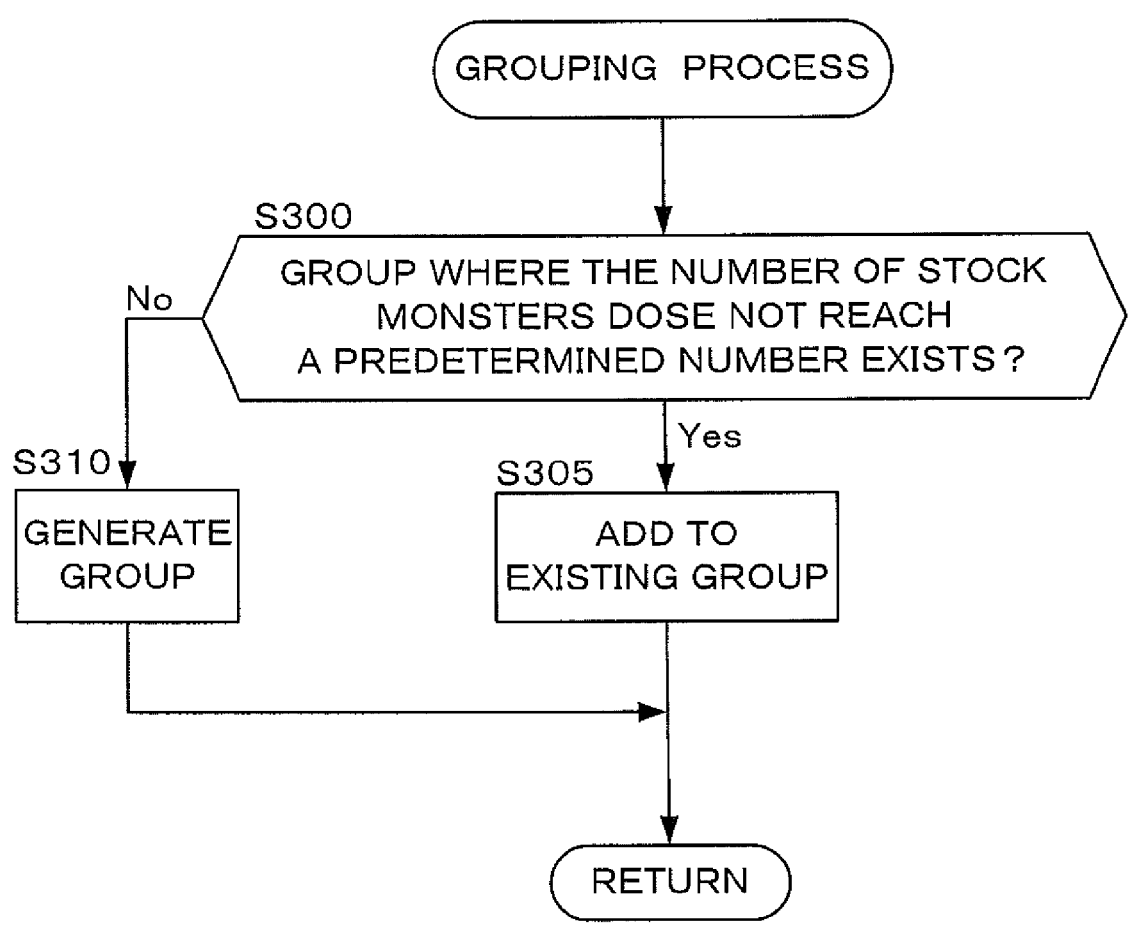
[FIG. 16] A flow chart showing a flow of processes in a grouping process.

The grouping process will be described by following a flow chart shown in FIG. 16. First, at step S300, it is determined whether or not, in the stock information storage portion 12c, there exists a group (hereinafter, "a shortage group") constituted by a stock monster SM the type of which is the same as the type of the stock monster to be processed, and the constituting monster information of which does not reach a predetermined number (in the present embodiment, 6). In a case of that there exists a stock frame SF, the group ID 42 of which corresponds to the type of the stock monster SM to be processed and the constituting monster information 43 of which indicates less than 6 stock monsters SM, it is determined that there exists the shortage group. In this case, an affirmative determination is obtained at step 300, and the process goes to step S305 to add the stock monster SM to the shortage group.

Namely, the monster ID 21 of the stock monster SM to be added is added to the constituting monster information 43 corresponding to the shortage group. Additionally, the group flag of the stock monster SM grouped is set. Thereby, the stock monster SM which is the object to be process is set to belong the group corresponding to the constituting monster information 43 where the stock monster SM is set. Additionally, the battle parameters (the line value, the attack ability value, the power value and the like) for the group are set, for each parameter, the value of each of the plural stock monsters SM constituting the group may be totalized, or the parameter values for the group may be calculated by a predetermined calculation method. The calculated parameter values are set in the group attribute 44 of the stock information 40. After the adding process, the grouping process ends.

On the other hand, when a negative determination is obtained at step S300, the process goes to step S310 to generate a new group. A new group ID is set in the group ID 42 of the stock information 40 where the stock monster SM which is an object to be grouped is set. Also, the group flag of the stock monster SM which is the object to be possessed is set. Thereby, the stock monster SM is set to belong the group of the group ID 42 newly set. For example, in a case of the stock frame (1,1), where only A stock monsters AS is correlated, by setting a new group ID to the group ID 42 of the stock frame (1,1), a group is set to be correlated to the stock frame (1,1). After the group generation process, the grouping process is ended.

Figure 17:
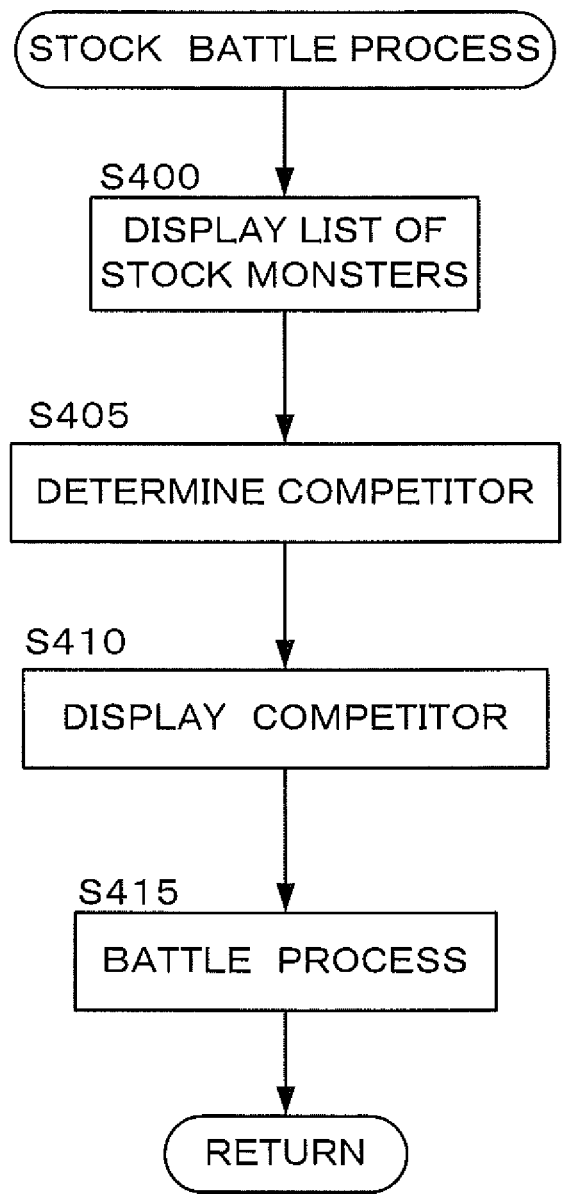
[FIG. 17] A flow chart showing a flow of processes in a stock battle process.

In a case that a stock battle operation for battling the stock monster SM at the player's desired timing is performed by him/her, a stock battle process starts. The stock battle process will be described by following a flowchart shown in FIG. 17. The stock battle process is controlled by the game control portion 13, and thereby, the game control portion 13 functions as the stock battle game execution portion 13a. First, at step S400, a list of battle candidates is displayed on the monitor based on the stock information 40. As the stock frame SF functions as a unit of competitor, in a case of the stock frame SF where the group ID 42 is being set, the group is displayed as one of the competitor candidates. In a case of the stock frame SF where the group ID 42 is not set, the stock monster SM set in the constituting monster information 43 is displayed singly as one of the competitor candidates.

Next, at step S405, the competitor is determined. For example, one competitor is determined from the displayed list of the competitor candidates by a selection operation by the player. In a case that there are plural player characters PC, one competitor is determined for each of the player characters PC. In this case, as mentioned above, each player character PC and each competitor are correlated to each other by correlating the character frame CF corresponding to each player character PC to the stock frame SF of the competitor determined. Subsequently, at step S410, the determined competitor is displayed in the battle image, and at step S415, the battle process is executed.

The processes of this battle process may be similar to the processes of the battle process in the stock control process. However, in the stock control process, when a stock frame SF of a group is selected as a competitor, the battle parameters set in the group attribute 44 are used, and when a stock frame SF of not a group is selected, the battle parameters set in the attribute 25 of the corresponding monster M. In a case that the competitor is defeated, the stock information 40 and the monster data 20 corresponding to the competitor are deleted.

Figure 18:
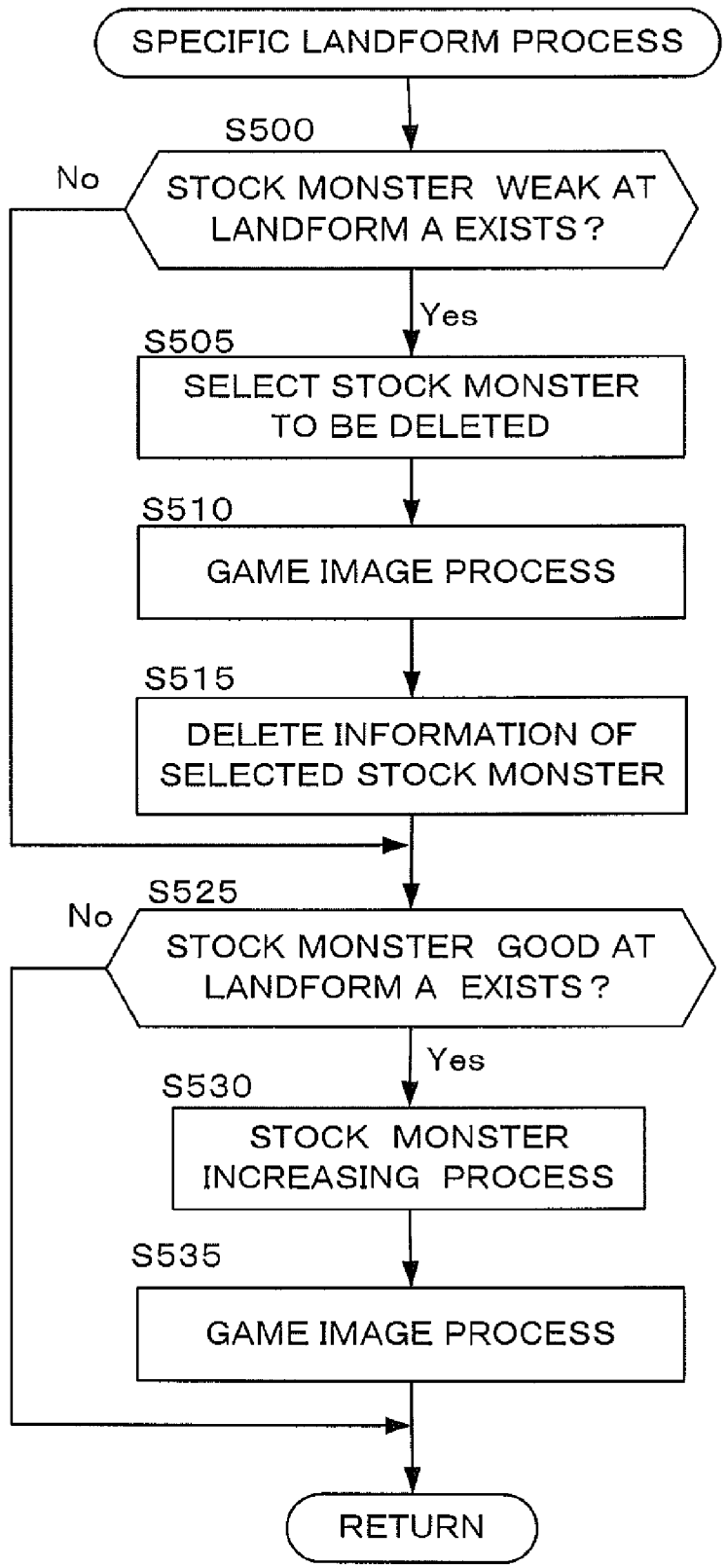
[FIG. 18] A flow chart showing a flow of processes in a specific landform process.

For example, a specific landform process will be described by following a flowchart shown in FIG. 18, the specific landform process being executed in a case that the player character PC comes close to a landform A which is a specific landform. First, at step S500, it is determined whether there exists a stock monster which is weak at the landform A. It may be determined by referring to the attribute 25 of each stock monster SM, that is, the attribute 25 of the monster information 20 where the stock flag is being set. In a case where a negative determination is obtained at step S500, the process goes to step S525.

In a case that an affirmative determination is obtained at step S500, the process goes to step S505, and the stock monster SM to be deleted is selected. For example, in a case that the A stock monster AS is weak at the landform A, the stock information storage portion 12c is referred, and the A stock monster AS to be deleted is determined out of the A stock monsters AS registered in the stock flame information 40. The number of A stock monsters AS to be deleted, for example, may be a predetermined constant number, or may be the number according to the total number of A stock monsters AS based on a certain rate correlated to the landform A. Next, the process goes to step S510 to execute a game image process.

In the game image process, a state that the stock monsters SM the deletion of which has been determined at step S505 run away from the player character PC is displayed in the game image GI. Subsequently, the process goes to step S515 to delete the set of the stock information 40 and the monster information 20 corresponding to the stock monster SM the deletion of which has been deleted at step S505.

At step S525, it is determined whether there exists a stock monster which is good at the landform A. Similarly to the case of step S500, it may be determined by referring to the attribute 25 of each stock monster SM, that is, the attribute 25 of the monster information 20 where the monster flag is being set. A negative determination is obtained at step S525, the process goes to step S530 to execute a stock monster increasing process.

To be specific, a predetermined number of pieces of the monster information 20 of the stock monsters SM which are good at the landform A are copied and only the monster ID 21 of each copied piece of monster information 20 is newly set. Additionally, the newly generated monster IDs 21 are set in a stock frame SF which is blank. The increased number of stock monsters SM may be a constant number or may be the number according to the total number of stock monsters SM based on a certain rate correlated to the landform A. Subsequently, the process goes to step S535 to execute a game image process. For example, the game image process may be executed so that a state that the number of stock monsters SM which move following the player character PC has increased by the processes of the step S530. After that, the specific landform process ends.

Figure 19:
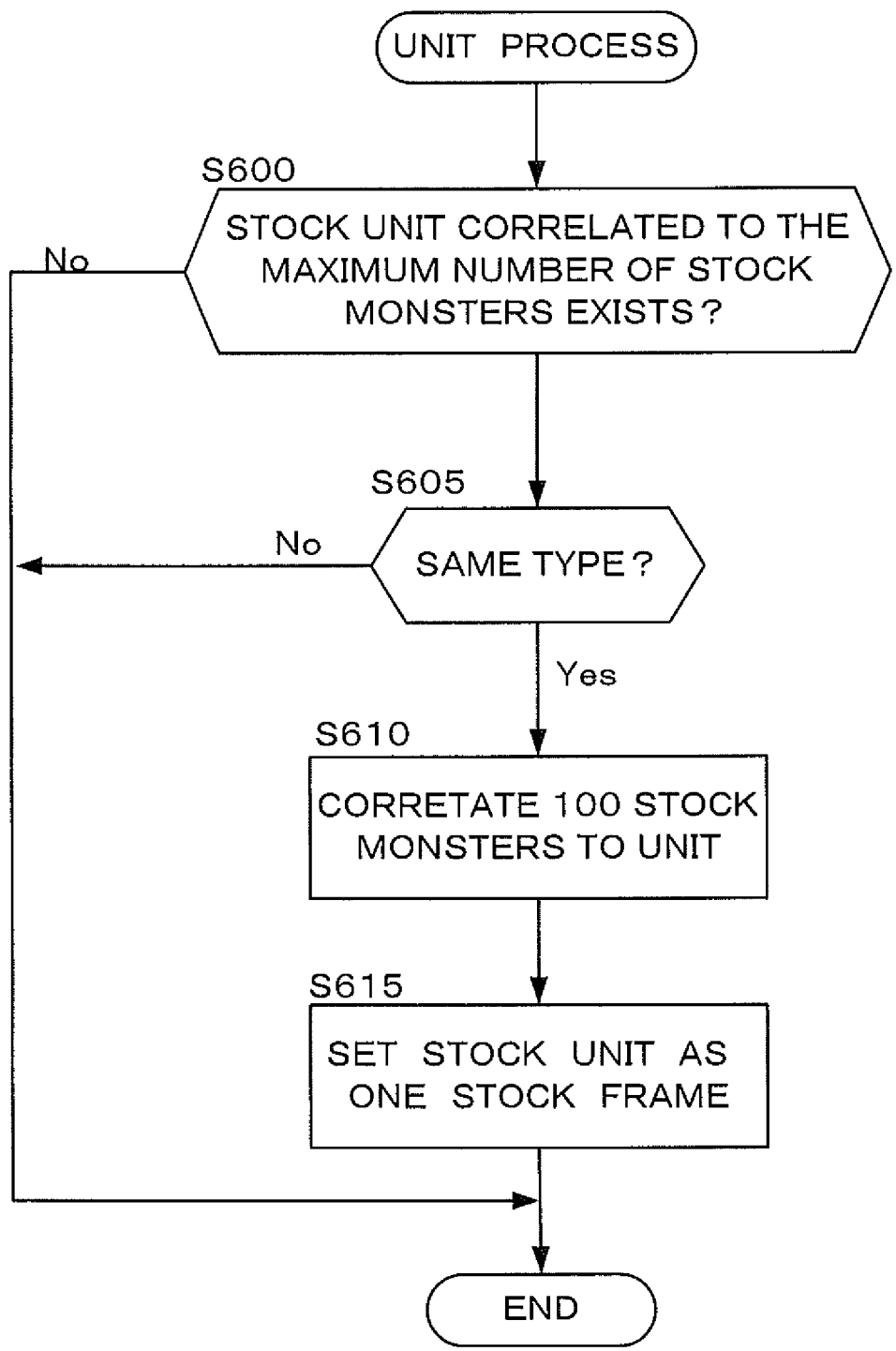
[FIG. 19] A flow chart showing a flow of processes in a unit process.

A unit process for generating the expansion group above mentioned will be described by following a flow chart shown in FIG. 19. The unit process is controlled by the game control portion 13, and thereby, the game control portion 13 functions as a unit process portion. First, at step S600, it is determined whether or not there exists a stock unit SU correlated to the maximum number (36) of stock monsters SM. When A negative determination is obtained, the unit process ends. An affirmative determination is obtained at step S600, the process goes to step S605 to determine whether or not all of the stock monsters SM constituting the stock unit SU are the same type. When a negative determination is obtained at step S605, the unit process ends. An affirmative determination is obtained at step S605, the process goes to step S610.

At step S610, an expansion group is correlated to the stock unit SU, the expansion group including 100 pieces of stock monsters SM which are the same type as the stock monsters SM constituting the stock unit SU. Accordingly, in one stock unit SU, even if a maximum number of stock monsters SM are correlated to each of the stock frames 1 to 6, the maximum total number of the stock monsters SM is 36, but if the conditions of step S600 and step S605 are satisfied, it is possible to increase the number of stock monsters to 100. With respect to the 64 added pieces of stock monsters SM, the processes for adding each of them may be similar to the processes of step S530 above mentioned.

Subsequently, at step S615, the stock unit SU to which the stock monsters SM are added is set as a stock frame SF. For example, in a case that the stock unit SU1 is an object to be processed, the 100 stock monsters SM may be correlated to any one stock frame SF (1,1) of stock frames SF constituting the stock unit U1, and the other stock frames SF (1,2) to SF(1,6) may be deleted. Thereby, it has become possible to treat the stock unit SU1 and the stock frame SF (1,1) equally.

The game system of the present invention is not limited to the above embodiment and may be executed as various embodiments. For example, the process selection image SG is displayed to make the player select whether or not he/she retains the battle game may be after the battle image of the battle game is displayed, or may be during the battle game after the battle game starts. In the latter case, it is enough that the battle process for the battle game is cut off and the processes of step S120 and after are executed. Moreover, the game system may be configured so that a monster M is displayed in advance, and when the position of player character PC and the position of displayed monster satisfy a predetermined condition, the displayed monster is set as a competitor.

In the above embodiment, the battle parameters for a group is set to each group. However, in a case that a battle type of the stock battle game is a type that each of stock monsters SM included in a group battles the player character PC independently, the battle parameters for each stock monster SM may be used as they are. Moreover, although, in the above embodiment, the stock monsters SM are grouped based on the elapsed time from the moment when the monster M is set as the stock monster SM, for example, the game system may be configured so that, in a case that a predetermined event occurs during the game, a predetermined number of stock monsters SM are grouped.

In a case that the blank stock frame SF is run out, the game system may be configured so that any one of stock frames SF is selected and the stock battle is executed forcibly. The process selection image may be displayed either after the battle image is displayed or after before a monster M appears in the game image GI. Moreover, the game system may be configured so that, in a case that a predetermined condition is satisfied at the moment when a monster appears, the monster M is set as a stock monster SM automatically.

With respect to the display state which is changed by the display change portion depending on the number of stock monsters SM, for example, a gauge indicating directly the number of stock monsters SM may be displayed, or the appearance of player character (the color, the pattern, the body type or the like) may be changed. The game system may be configured such that the number of stock monsters SM and a game state are associated with each other to affect each other. For example, depending on the number of stock monsters SM, the parameters of player character may be changed, or the kinds of items to appear may be changed. The number of stock monsters SM may be changed depending on an item which the player character obtains.

Figure 20:
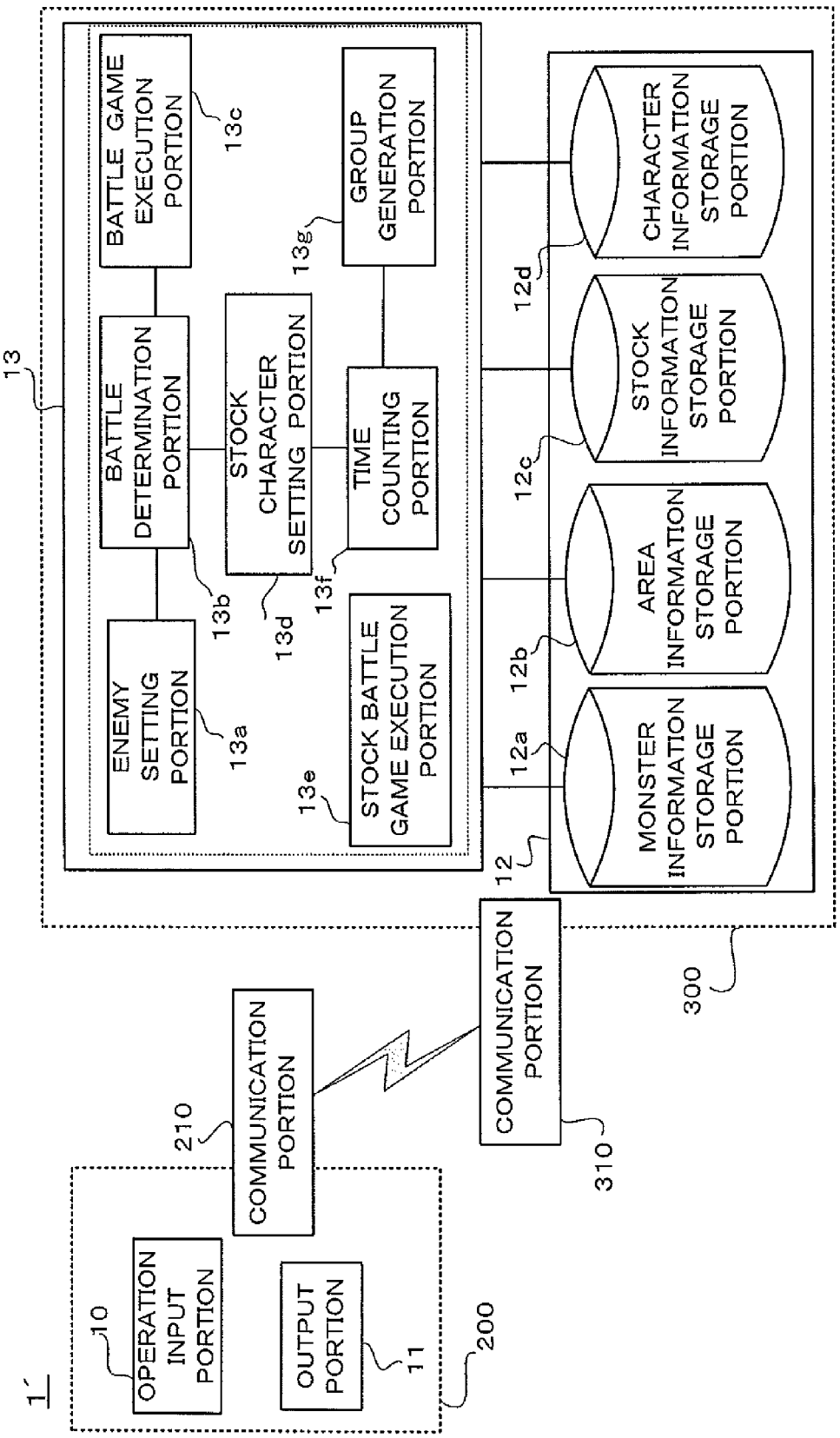
[FIG. 20] A diagram showing the other mode of the game system of the present invention.

The game system 1 of the present invention may be realized as one stand-alone game machine, or realized as a game system 1' including a player terminal machine 200 having an operation input portion 10 and an output portion 11. and a server 300, the player terminal machine having a game control portion 13 and a storage portion 12, as shown in FIG. 20. With respect to the data communication between the player terminal machine 200 and the server 300, for example, a communication portion 210 may be installed to the player terminal machine 200, the communication portion 20 making the player terminal 200 function as a slave machine (where only an acceptance of operation inputs by a player and an output to the player are executed) of the conventional master-slave system, and a communication portion 310 may be installed to the server 300, the communication portion 310 making the server 300 function as a master machine.

Figure 21:
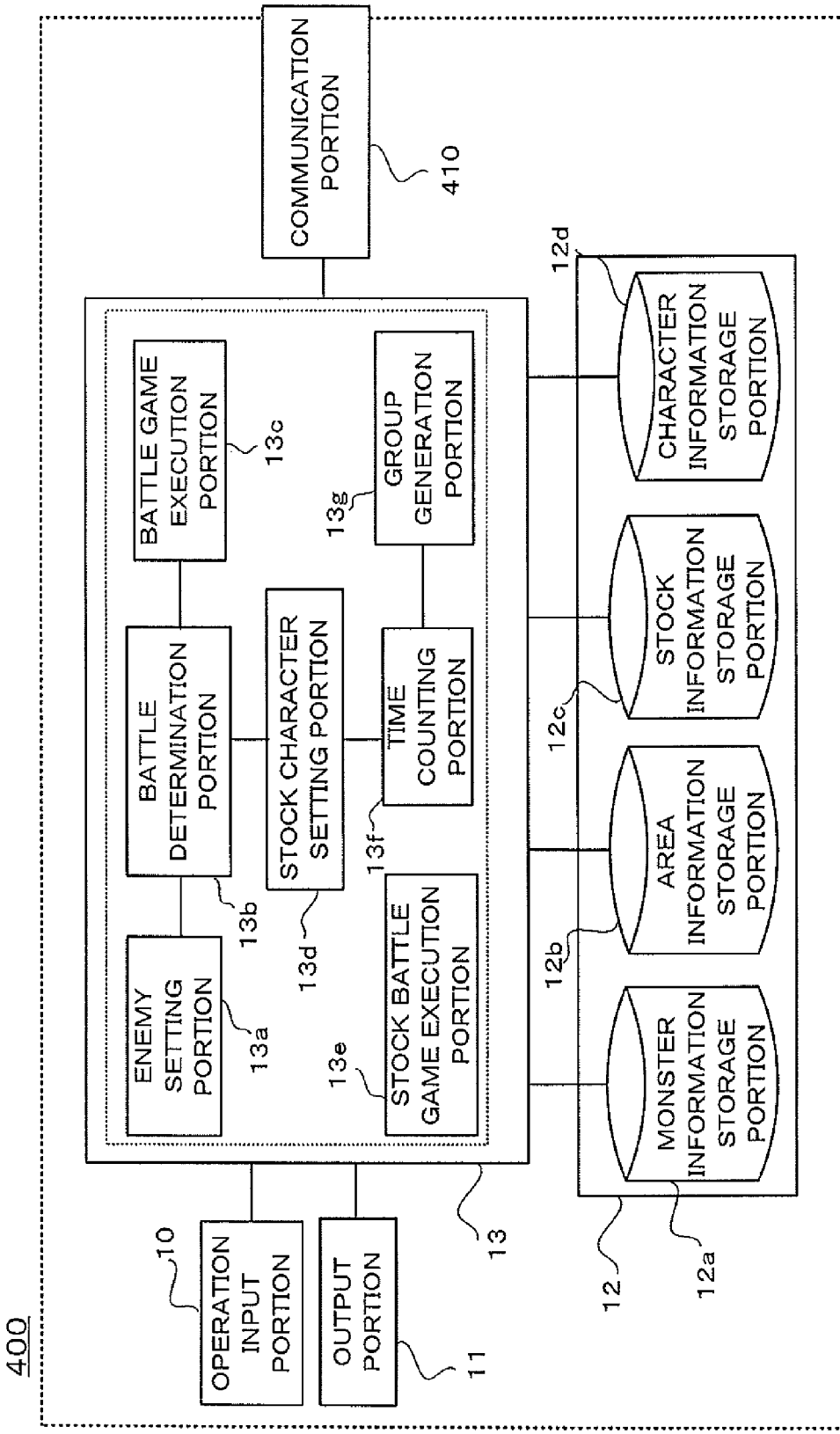
[FIG. 21] A diagram showing a hardware configuration of the game machine of the present invention.

Moreover, the present invention may be realized as one game machine 400 where a communication portion 410 capable of communicating the other game machine is added to the configuration of the game system 1, as shown in FIG. 21. With respect to the system for communicating the other game machine 400, a conventional system, such as a communication through the internet and an ad-hoc communication where the game machines are connected directly, may be applied. An obtaining information process portion may be further provided to the game control portion 13 of the game machine 400, the obtaining information process portion processing the information of obtained stock characters. For example, a united character obtained by uniting the obtained stock character and the stock character of the game machine may be generated (for example, a part of each character may be united, or united characters may be prepared in advance).

The invention claimed is:

1. A game system comprising:
 a display portion adapted and configured to display a game image;
 an operation input portion adapted and configured to accept operations by a player; and
 a display information storage portion adapted and configured to store display information where a display point at which an enemy character is displayed in a game field where a player character can travel and the enemy character are correlated with each other,
 where a game is executed such that the player character is moved in the game field displayed in the game image, and when the player character and the enemy character have a predetermined relation with each other, a battle game is started between the player character and the enemy character,
 wherein the game system further comprises:
  an enemy setting portion adapted and configured to set the enemy character to be made to battle the player character in the battle game based on the position of the player character and the display point;
  a battle determination portion adapted and configured to make the player select whether or not a battle between the player character and the enemy character is retained;
  a battle game execution portion adapted and configured to, if the player selects to not retain the battle, execute a battle game between the player character and the enemy character set by the enemy setting portion;
  a stock character setting portion adapted and configured to, if the player selects to retain the battle:
   set the enemy character set by the enemy setting portion as the stock character, and
   resume the game without executing the battle game between the player character and the enemy character set by the enemy setting portion; and
  a stock battle game execution portion adapted and configured to, when an operation for making the player character battle the stock character is performed by the player, execute a stock battle game using the enemy character set as the stock character as a competitor.

2. The game system according to claim 1, further comprising
 a display change portion which changes a state of predetermined display in the game image depending on the number of enemy characters set as the stock monsters.

3. The game system according to claim 1, wherein
 a plurality of competitor frames are prepared, each of the competitor frames corresponding to a competitor in the stock battle game, and being correlated to at least one stock character,
 the stock character setting portion correlates the enemy character set as the stock character to the competitor frame to which no stock characters are correlated out of the plurality of competitor frames, and
 the stock battle game execution portion specifies any one of the competitor frames as a competitor, and executes the stock battle game between the stock character correlated to the competitor frame specified and the player character.

4. The game system according to claim 3 further comprising
 a group generation portion which, when a predetermined condition is satisfied in the game, generates at least one group constituted by the stock characters correlated to each of the plurality of competitor frames, and correlates the group generated to the competitor flame.

5. The game system according to claim 4 further comprising
 a time counting portion which, with respect to each stock character, counts elapsed time after the moment when the enemy character is set as the stock character, wherein the group generation portion generates at least one group by the stock characters the elapsed time of which has been beyond a predetermined time.

6. The game system according to claim 5, wherein
the group generation portion generates the plural groups so that the number of enemy characters included in each group is not beyond a predetermined maximum number, and correlates each of the plural groups to the competitor frame.

7. The game system according to any one of claim 4 further comprising an enemy character information storage portion which stores enemy character information where enemy character identification information for identifying the enemy character and at least one battle parameter to be used in the battle game are correlated to each other, wherein
the group generation portion calculates values of battle parameters for the group to be generated based on values of the battle parameters of the stock characters constituting the group to be generated, and
the stock battle game portion, when the group is selected as the competitor, uses the values of battle parameters for the group as the values of battle parameters for the competitor.

8. The game system according to claim 6, further comprising a unit process portion which, when the maximum number of stock characters are correlated to each of all competitor frames included in a competitor unit, correlates to the competitor unit, the stock characters more than a total of the stock characters included in the competitor unit, and sets as the competitor frame, the competitor unit to which the stock characters more than the total are correlated.

9. The game system according to claim 1, wherein the game system further comprises a landform information storage portion which stores a position in the game field and landform information of the position,
to the enemy character, specific landform information in which the landform information having a specific relation with the enemy character is set, is correlated and
the game system further comprises a specific landform process portion which, when a position of the player character and a position indicated in the land information have a predetermined relation, detects the stock character to which the landform information is correlated as the specific landform, and executes a process depending on the specific relation when the stock character is detected.

10. The game system according to claim 1 having: a player terminal machine including the display portion and the operation input portion; and
a server including the display information storage portion and a game control portion which executes, in reply to operations by the player of the player terminal machine, the game where the player character is moved in the game field displayed in the game image, and the battle game is started between the player character and the enemy character set as the competitor, wherein
the enemy setting portion, the battle determination portion, the battle game execution portion, the stock character setting portion, and the stock battle game execution portion are provided in the game control portion of the server.

11. A non-transitory storage medium storing a game program which makes a computer execute a game such that a player character is moved in a game field displayed in a game image and when the player character and an enemy character have a predetermined relation with each other, a battle game is started between the player character and the enemy character, the computer comprising: a display portion adapted and configured to display the game image; an operation input portion adapted and configured to accept operations by a player; and a display information storage portion adapted and configured to store display information where an display point at which the enemy character is displayed in the game field where the player character can travel and the enemy character are correlated with each other, wherein the game program is configured to make the computer function as:
an enemy setting portion adapted and configured to set the enemy character to be made to battle the player character in the battle game based on the position of the player character and the display point;
a battle determination portion adapted and configured to make the player select whether or not a battle between the player character and the enemy character is retained;
a battle game execution portion adapted and configured to if the player selects to not retain the battle, execute a battle game between the player character and the enemy character set by the enemy setting portion;
a stock character setting portion adapted and configured to, if the player selects to retain the battle:
set the enemy character set by the enemy setting portion as the stock character, and
resume the game without executing the battle game between the player character and the enemy character set by the enemy setting portion; and
a stock battle game execution portion adapted and configured to, when an operation for making the player character battle the stock character is performed by the player, execute a stock battle game using as competitor, the enemy character set as the stock character as a competitor.

12. A game machine comprising:
a display portion adapted and configured to display a game image;
an operation input portion adapted and configured to accept operations by a player; and
a display information storage portion adapted and configured to store display information where an display point at which an enemy character is displayed in a game field where a player character can travel and the enemy character are correlated with each other,
where a game is executed such that the player character is moved in the game field displayed in the game image, and when the player character and the enemy character have a predetermined relation with each other, a battle game is started between the player character and the enemy character,
wherein the game machine further comprises:
an enemy setting portion adapted and configured to set the enemy character to be made to battle the player character in the battle game based on the position of the player character and the display point;
a battle determination portion adapted and configured to make the player select whether or not a battle between the player character and the enemy character is retained;
a battle game execution portion adapted and configured to, if the player selects to not retain the battle, execute a battle game between the player character and the enemy character set by the enemy setting portion;
a stock character setting portion adapted and configured to, if the player selects to retain the battle:
set the enemy character set by the enemy setting portion as the stock character, and resume the game without executing the battle game between the player character and the enemy character set by the enemy setting portion;

a stock battle game execution portion adapted and configured to, when an operation for making the player character battle the stock character is performed by the player, execute a stock battle game using as a competitor, the enemy character set as the stock character as a competitor; and a communication portion to transmit to another game machine, information of enemy character set as the stock character.

13. The game machine according to claim 12, wherein
the communication portion of the game machine obtains from the another game machine, the information of the enemy character set as the stock character of the another game machine, the stock battle game execution portion executes the stock battle game by using as the competitor, the obtained enemy character set as the stock character.

* * * * *